(12) United States Patent
Helber et al.

(10) Patent No.: US 7,445,736 B2
(45) Date of Patent: *Nov. 4, 2008

(54) EMBOSSED INDICIA ON FOAM CORE IMAGING MEDIA

(75) Inventors: Margaret J. Helber, Rochester, NY (US); John E. Benson, Webster, NY (US); Peter T. Aylward, Hilton, NY (US); Barry M. Brown, Athens (CA)

(73) Assignee: Eastman Kodak Company, Rochester, NY (US)

( * ) Notice: Subject to any disclaimer, the term of this patent is extended or adjusted under 35 U.S.C. 154(b) by 939 days.

This patent is subject to a terminal disclaimer.

(21) Appl. No.: 10/328,547

(22) Filed: Dec. 23, 2002

(65) Prior Publication Data

US 2004/0119202 A1   Jun. 24, 2004

(51) Int. Cl.
*B29C 44/56* (2006.01)

(52) U.S. Cl. .................. 264/51; 264/132; 264/321; 264/46.4

(58) Field of Classification Search ............ 264/51, 264/293, 321, 132, 46.4
See application file for complete search history.

(56) References Cited

U.S. PATENT DOCUMENTS

| 1,427,512 | A | | 8/1922 | Brown | |
| 3,196,062 | A | | 7/1965 | Kristal | |
| 3,655,312 | A | * | 4/1972 | Erb et al. | 425/115 |
| 4,040,830 | A | * | 8/1977 | Rogers | 430/212 |
| 4,064,205 | A | * | 12/1977 | Landsman | 430/200 |
| 4,176,148 | A | * | 11/1979 | Magder et al. | 264/41 |
| 4,229,406 | A | | 10/1980 | Pollock | |
| 4,384,904 | A | | 5/1983 | Kauffman et al. | |
| 4,500,116 | A | * | 2/1985 | Ferro et al. | 283/92 |
| 4,832,775 | A | | 5/1989 | Park et al. | |
| 5,160,777 | A | | 11/1992 | Woodward et al. | |
| 5,851,651 | A | | 12/1998 | Chao | |
| 5,866,282 | A | | 2/1999 | Bourdelais et al. | |
| 6,308,883 | B1 | * | 10/2001 | Schmelzer et al. | 229/403 |
| 6,447,976 | B1 | * | 9/2002 | Dontula et al. | 430/201 |
| 6,699,629 | B1 | * | 3/2004 | Helber et al. | 430/22 |
| 6,811,641 | B2 | * | 11/2004 | Kerr et al. | 156/209 |

FOREIGN PATENT DOCUMENTS

| AU | 80284 75 | 10/1976 |
| GB | 2331 731 | 6/1999 |
| JP | 09106038 A | 4/1997 |
| JP | 09127648 A | 5/1997 |
| JP | 2839905 B2 | 12/1998 |

* cited by examiner

*Primary Examiner*—Suzanne E. McDowell

(57) ABSTRACT

This invention provides method for placing indicia on a support for an imaging element comprising embossing indicia, such as a logo, on a roller; providing a support wherein said support comprises a closed cell foam core and adhered thereto at least one flange layer, wherein said closed cell foam core comprises a polymer that has been expanded through the use of a blowing agent; and pressing said support against said embossed roller.

39 Claims, No Drawings

EMBOSSED INDICIA ON FOAM CORE IMAGING MEDIA

CROSS REFERENCE TO RELATED APPLICATIONS

Reference is made to commonly assigned, co-pending U.S. patent applications:
Ser. No. 10/328,335 by Helber et al. filed of even date herewith entitled "Indicia On Foam Core Support Media"; and
Ser. No. 10/327,735 by Helber et al. filed of even date herewith entitled "Process Survivable Indicia On Foam Core Imaging Supports", the disclosures of which are incorporated herein.

FIELD OF THE INVENTION

The invention relates to a method for applying indicia, such as patterns, characters, and symbols, onto a closed cell foam core imaging member with polymer layers thereon.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals, failing which, a stain is apparent on the print border accompanied by a severe loss in image quality. In the formation of 'photo-quality' ink jet paper, it is important that the paper is readily wetted by ink and that it exhibits the ability to absorb high concentrations of ink and dry quickly. If the ink is not absorbed quickly, the elements block (stick) together when stacked against subsequent prints and exhibit smudging and uneven print density. For thermal media, it is important that the support contain an insulative layer in order to maximize the transfer of dye from the donor, which results in a higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base or support that has applied thereto a layer of polyolefin resin, typically polyethylene, on each side, which serves to provide waterproofing to the paper and also provides a smooth surface on which the photosensitive layers are formed. In an imaging material described in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as titanium dioxide above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' ink jet paper.

In all of the above imaging supports, multiple operations are required to manufacture and assemble the individual layers into a support. For example, photographic paper typically requires a paper-making operation followed by a polyethylene extrusion coating operation, or as disclosed in U.S. Pat. No. 5,866,282, a paper-making operation is followed by a lamination operation for which the laminates are made in yet another extrusion casting operation. There is a need for imaging supports that can be manufactured in a single in-line manufacturing process while still meeting the stringent features and quality requirements of imaging supports.

It is also well known in the art that traditional imaging supports consist of raw paper base. For example, in typical photographic paper as currently made, approximately 75% of the weight of the photographic paper comprise the raw paper base. Although raw paper base is typically a high modulus, low cost material, there exist significant environmental issues with the paper manufacturing process. There is a need for alternate raw materials and manufacturing processes that are more environmentally friendly. Additionally to minimize environmental impact, it is important to reduce the raw paper base content, where possible, without sacrificing the imaging support features that are valued by the customer, that is, strength, stiffness, surface properties of the imaging support.

An important corollary of the above is the ability to recycle photographic paper. Current photographic papers cannot be recycled because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging support changes as a function of the humidity of its immediate environment. There is a need for an imaging support that minimizes curl sensitivity as a function of humidity, or ideally, does not exhibit curl sensitivity.

In papers having a backside polyolefin coating, an absence of titanium dioxide in the backside polyolefin coating results in the print indicia appearing clear and the overall required total opacity is achieved in general by the filling of the rawbase paper and a corresponding titanium dioxide addition into the polyethylene coating of the front face side. However, with some imaging base papers, there is required such a high opacity that a titanium dioxide addition is also required in the backside coating. Based on this titanium dioxide addition, an interference with the legibility of the print picture occurs. There is a need for a high opacity imaging base which avoids this legibility interference.

The stringent and varied requirements of imaging media, therefore, demand a constant evolution of material and processing technology. One such technology known in the art as 'polymer foams' has previously found significant application in food and drink containers, packaging, furniture, and appliances. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to the major surface of the polystyrene foam substrate. The foregoing composite foam/film structure may be shaped by conventional processes as thermoforming to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in imaging media. For example, JP 2839905 B2 discloses a 3-layer structure comprising a foamed polyolefin layer on the image-receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper support using a hot melt adhesive. The disclosure JP 09127648 A highlights a variation of the JP 2839905 B2 structure, in which the resin on the backside of the paper support is foamed, while the image receiving side resin layer is unfoamed. Another variation is a 4-layer structure highlighted in JP 09106038 A. In this, the image receiving resin layer comprises 2 layers, an unfoamed resin layer which is in contact with the emulsion, and a foamed resin layer which is adhered to the paper support. There are several problems with this, however. Structures described in the foregoing patents need to use foamed layers as thin as 10 μm to 45 μm, since the foamed resin layers are being used to replace existing resin coated layers on the paper support. The thickness restriction is further needed to maintain the structural integrity of the photographic paper support since the raw paper base is providing the stiffness. It is known by those versed in the art of foaming that it is very difficult to make thin uniform foamed films with substantial reduction in density especially in the thickness range noted above.

Several disadvantages occur when employing the conventional printing processes for this kind of characterizing and/or marking of imaging supports and in particular closed cell foam core imaging members. First, the closed cell imaging members have a non-porous surface and there are problems in printing them with conventional printing inks. With conventional paper based imaging members, the base paper is somewhat porous and the inks will quickly wet the surface and the water will be partly absorbed into the fiber structure of the paper. When printing a closed cell foam core member, the surface tension of the foam core is such that some volatile organic materials may have to be added to the ink formula. These materials may include high boiling alcohols that have a high vapor pressure thus requiring high temperatures be used to drive off these materials. This creates additional problem with environmental emissions as well as presenting additional difficulties to assure safe working conditions for the operators. Furthermore, the print indicia, such as characters, may generate interfering effects relating to the final photographic picture, generated on the emulsion-coated side, based on photo-chemical reactions.

Embossing the polyolefin-coated photographic base paper has already been tried for the application of indicia. For this purpose, the polyethylene-coated paper was passed through a calender, where the roller of the calender was furnished with a specially structured surface. This method has proven to be unsuitable for the application of indicia, since no uniform stamping and impression depth could be achieved. In addition, the method required two separate operations, coating and stamping, which could not be performed in one single operational step.

In addition, a method exists in the art, where a chill cylinder roller, with a specially prepared surface is employed for the application of different indicia, such as patterns or symbols, onto the back side of a polyolefin-coated base paper, which chill cylinder roller allows the polyolefin-extrusion coating and the characterization in one single operational step, in-line.

U.S. Pat. No. 5,160,777 proposes to provide a means of embossing the backside of a resin coated paper based imaging member. This patent discloses that, in order to emboss the backside of a resin coated paper base, limitation of the depth of the backside embossing and gloss differences between the print area and background are necessary to prevent transfer of the embossed indicia to the face side. Such limitations limit the usefulness of the embossing method because the ability to see embossed logo indicia largely depends on the spectral reflection difference between two areas with different roughnesses. There remains a need to provide a means and an imaging member which provides the necessary properties of conventional imaging supports that is less prone to embossed indicia transfer in order to provide better brand recognition and manufacturing quality control.

SUMMARY OF THE INVENTION

The present invention relates to a method for placing indicia on a support for an imaging element comprising embossing indicia on a roller; providing a support wherein the support comprises a closed cell foam core and adhered thereto at least one flange layer, wherein the closed cell foam core comprises a polymer that has been expanded through the use of a blowing agent; and pressing the support against the embossed roller. The present invention also includes a method for placing indicia on a support for an imaging element comprising embossing indicia on a roller; providing a support wherein the support comprises a closed cell foam core having at least one molten polymer flange layer adhered thereto, wherein the closed cell foam core comprises a polymer that has been expanded through the use of a blowing agent; and pressing at least one molten polymer flange layer of the support against an embossed roller, and a method for placing indicia on a support for an imaging element comprising providing a support wherein the support comprises a closed cell foam core wherein the closed cell foam core comprises a polymer that has been expanded through the use of a blowing agent, and pressing the support against an embossed roller.

ADVANTAGEOUS EFFECT OF THE INVENTION

This invention provides a superior imaging support. Specifically, it provides an imaging support of high surface hardness and overall base compressibility that will resist the transfer of embossed indicia from the backside to the face side. It also provides an imaging support that can be manufactured using a single in-line operation. It also provides an imaging support that can be effectively recycled.

DETAILED DESCRIPTION OF THE INVENTION

The invention provides a means of embossing indicia on a polymeric flange layer-coated closed cell foam core imaging member, preferably on the backside. The invention provides an imaging member that has good compressive resiliency and sufficiently hard surface as to minimize the transfer of a differential height indicia that has been embossed into the flange layer, preferably on the backside of the back polymer flange layer. Furthermore, the imaging element has much less tendency to curl when exposed to extremes in humidity. The imaging member may be manufactured in a single in-line operation, which significantly lowers the imaging member manufacturing costs and would eliminate disadvantages in the manufacturing of the current generation of imaging supports, including very tight moisture specifications in the raw base. The imaging member may also be recycled to recover and reuse polyolefin instead of being discarded into landfills.

The present invention uses foam at the core of the imaging member surrounded by high modulus flange layers that provide the needed resistance to indicia transfer as well as the needed stiffness to add the capacity to support imaging layers to a resilient foam core. Additionally, this invention provides a face side surface of the imaging member that has an upper surface that is resistant to the transfer of the backside logo indicia that has a differential height between the indicia and the background. This may be accomplished by providing a upper surface that has sufficient hardness to resist the interlayer pressure between the backside logo indicia and the upper flange layer of the imaging member. Additionally, this invention provides a roughness to the upper flange support that further reduces the transfer of the backside embossed logo indicia. Using these approaches, many new features of the imaging support may be exploited and restrictions in manufacturing eliminated.

In one embodiment, the present method provides for placing indicia on a support for an imaging element comprising providing a support of closed cell foam core comprising a polymer that has been expanded through the use of a blowing agent, and pressing the support against an embossed roller. In another embodiment, the invention relates to a method for placing indicia on a support for an imaging element comprising embossing indicia on a roller; providing a support comprising a closed cell foam core and adhered thereto at least one flange layer, wherein the closed cell foam core comprises a polymer that has been expanded through the use of a blowing agent; and pressing the support against the embossed roller. Other embodiments may include a chill cylinder roller, disposed in-line and furnished with etched or engraved indicia, such as patterns or symbols, on its surface, employed during extrusion coating, whereby the indicia, such as a pattern, to be embossed in the back side polymer flange layer, characterized by an increase in height or, alternatively, a decrease in height of the surface level in certain areas of the chill cylinder roller, and which is further distinguished, as compared to the remaining cylinder-roller surface, by a different roughness.

Another preferred method for marking or printing onto a back side of a closed cell imaging member, having flange layers thereon, comprises mounting a pressure roller onto a machine frame. A chill cylinder roller has indicia, such as patterns or symbols, etched into the surface of the chill cylinder roller. A height level and chill cylinder roller surface structure difference exists between the chill cylinder roller surface, on the one hand, and the indicia, such as patterns or symbols, etched or engraved onto the chill cylinder roller surface, on the other hand. The height-level difference measured at the chill cylinder roller, amounts to from 3 to 20 micrometers. The chill cylinder roller may be disposed on the machine frame in parallel to the pressure roller, thereby forming a nip between the pressure roller and the chill cylinder roller. Expanded and oriented closed cell foam core may be passed through the nip between the pressure roller and the chill cylinder roller. A polymer coating layer may be brought as a semifluid molten film through the nip between the chill cylinder roller and the pressure roller onto the surface of closed cell foam core for generating simultaneously a replication of the surface structure of the chill cylinder roller on the polymer coating layer. The chill cylinder roller surface structure difference causes a difference in the reflective properties of the polymer coated closed cell foam core imaging member between areas corresponding to the indicia on the chill cylinder roller surface and the surrounding areas of the chill cylinder roller surface. This roughness difference between the indicia, such as patterns, embossed into the polymer coating of the closed cell foam core and the area of the coating surrounding the indicia, such as patterns or symbols, is such that the higher disposed surface areas of the chill cylinder roller have a structure resulting in generation of a lower surface roughness level in first regions on the polymer coated closed cell foam core imaging member as compared to second regions of the polymer coated imaging corresponding to the lower disposed surface areas of the chill cylinder roller. The structuring of the chill cylinder roller surface may be generated in various ways, for example, by etching of the surface of a steel cylinder outside of the area of the indicia face, which results in a surface structure having an increase in the indicia pattern or a hump versus the remaining surface. Alternatively, a method may be employed where the resulting indicia is visible as a recess. The background may be either smooth or rough as long as the indicia area is opposite in relative roughness.

Another preferred method for the marking or providing indicia on the back side of a polymer flange layer coated closed cell polymeric foam core imaging member may be a method in which the polymer flange layer is extruded as a molten film through a nip between a chill cylinder roller, with indicia, such as patterns or symbols, etched into the surface of the chill cylinder roller, and a pressure roller onto the surface of closed cell polymeric foam core and simultaneously replication of the surface structure of the chill cylinder roller is obtained. A height level and a roughness difference exist between the chill cylinder roller surface, on the one hand, and the indicia, that is, patterns and symbols, etched or engraved onto the chill cylinder roller surface, on the other hand. The height-level difference measured at the chill cylinder roller, amounts to from 3 to 20 micrometers. The roughness difference is between the background and the indicia area is approximately 145 Ra.

The indicia useful in the present invention may form a character, or a logo with at least one character. In other useful embodiments, the indicia, such as characters, may comprises at least one member selected from the group consisting of letters, pictures, numbers, symbols, and words. An additional useful embodiment of this invention would be to apply ink or colored material to the embossed indicia, such as a logo, area or to the background area and not the logo area, in order to provide indicia that are easier to view and are less angle dependant when viewing. The indicia may be engraved on the roller by several means such as laser or mechanical engraving, or chemical etching processes.

The support useful in the method for placing indicia on an imaging element comprises a closed cell foam core and at least one flange layer adhered thereto, wherein the closed cell foam core comprises a polymer that has been expanded through the use of a blowing. The support may contain at least one flange layer and preferably at least an upper flange layer and a lower flange layer. The closed cell polymer foam core comprises a homopolymer such as a polyolefin, polystyrene, polyvinylchloride or other typical thermoplastic polymers; their copolymers or their blends thereof; or other polymeric systems like polyurethanes, polyisocyanurates that have been expanded through the use of a blowing agent to consist of two phases, a solid polymer matrix, and a gaseous phase. Other solid phases may be present in the foams in the form of fillers that are of organic (polymeric, fibrous) or inorganic (glass, ceramic, metal) origin. The fillers may be used for physical, optical (lightness, whiteness, and opacity), chemical, or processing property enhancements of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention, polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide; though others may also be used. If necessary, these foaming agents may be used together with an auxiliary foaming agent, nucleating agent, and a cross-linking agent.

The flange layers useful with this invention are chosen to satisfy specific requirements of flexural modulus, caliper, surface roughness, hardness and optical properties such as colorimetry and opacity. The polymer coated flange layer forming the film may comprise a polymer that has a surface hardness that will minimize transfer of the indicia, which may form a pattern, when wound under high pressure and stored in roll form for a period of time. Useful polymers for the flange layer of the imaging member may include polyester and polyolefins, such as polyethylene, polypropylene, as well as oriented polymers sheet.

Additionally these polymer flange layers may comprise a pigment, colorants, optical brighteners, antioxidants and other addenda. The pigment may be any known pigment and is preferably selected from a member of the group consisting of titanium dioxide, barium sulfate, CaCO3, talc, clay ZnO, ZnS, carbon black, cobalt blue, and mixtures thereof. The amount of pigment may be from 0 to 30 weight-percent of the polymer flange layer.

The application amount of the polymer flange layer may amount to from 10 to 600 g/m$^2$. In the case of an oriented sheet comprising the flange polymer layer, such as biaxially oriented polypropylene (BOPP), any means of adhering the BOPP sheet to the closed cell foam core known in the art may be useful. This may include melt extruable polymer as well as solution coatable adhesives. In one embodiment, an adhesive may be used to join the closed cell foam core and the BOPP flange layer. The application amount of the adhesive used to join the closed cell foam core and the BOPP flange layer may be in the range of from 10 to 150 g/m$^2$. It should be noted that, if materials other than polyethylene are used on the upper surface, it may be necessary to prime or treat the upper surface to enhance the adhesion between the imaging layer. This is particularly important for light sensitive silver halide imaging layer that contains gelatin. The surface treatment and primer may be chemically or electrically modified as in corona treatment. If a chemical primer is added, attention should be given to the hardness of the primer layer. It may be useful to crosslink the polymer or provide matte bead or roughening materials to create a degree of roughness.

The flange layer may be formed integrally with the closed cell foam core by manufacturing the closed cell foam core with a flange layer skin sheet or the flange layer may be laminated to the closed cell foam core material. The integral extrusion of flange layer with the core is preferred to reduce costs. The integral lamination technique allows a wider range of properties and materials to be used for the skin materials. This is particularly useful in providing an upper surface that is very hard and resistant to the transfer of the backside indicia, such as logos. Oriented sheets of polymer may also be laminated inline with the foam core casting to provide a more crystalline than cast extruded flange layer and therefore are more resistant to backside indicia transfer.

Supports useful in this invention may have a compression modulus of greater than 8 MPa. Below 8 MPa the support is relatively hard and does not offer compressive loading spreading and therefore may be prone to the transfer of the indica, for example, a logo, from the backside, if wound under high pressure in roll form. Supports with compression modulus greater than 100 MPa are soft and difficult to handle. In an embodiment of this invention, the method of placing indicia on a closed cell foam core support has a compression modulus of from 8 to 100 MPa.

In another embodiment of this invention, the support may have at least one flange layer that comprises a polymer with a surface hardness of greater than 9 Rockwell R hardness and, in a preferred embodiment, the support may have at least one flange layer comprising a polymer with a surface hardness of from 9 to 150 Rockwell R hardness. Below 9 Rockwell R hardness, the polymer is more prone to the transfer of the backside indicia when wound in roll form and above 150 Rockwell R hardness, there is limited benefit to increase the hardness for the added expense and problems associated with processing very hard polymer.

The Rockwell Hardness test is a hardness measurement based on the net increase in depth of impression as a load is applied. Hardness numbers have no units and are commonly given in the R, L, M, E and K scales. The higher the number in each of the scales, the harder the material.

Hardness has been defined as resistance to local penetration, scratching, machining, wear or abrasion, and yielding. The multiplicity of definitions, and corresponding multiplicity of hardness measuring instruments, together with the lack of a fundamental definition, indicates that hardness may not be a fundamental property of a material, but rather a composite one including yield strength, work hardening, true tensile strength, modulus of elasticity, and others. In the Rockwell method of hardness testing, the depth of penetration of an indenter under certain arbitrary test conditions is determined. The indenter may either be a steel ball of some specified diameter or a spherical diamond-tipped cone of 120° angle and 0.2 mm tip radius, called Brale. The type of indenter and the test load determine the hardness scale (A, B, C).

A minor load of 10 kg is first applied, which causes an initial penetration and holds the indenter in place.Then, the dial is set to zero and the major load is applied. Upon removal of the major load, the depth reading is taken while the minor load is still on. The hardness number may then be read directly from the scale.

The hardness of ceramic substrates may be determined by the Rockwell hardness test, according to the specifications of ASTM E-18. This test measures the difference in depth caused by two different forces, using a dial gauge. Using standard hardness conversion tables, the Rockwell hardness value is determined for the load applied, the diameter of the indentor, and the indentation depth.

The hardness testing of plastics is most commonly measured by the Rockwell hardness test or Shore (Durometer) hardness test. Both methods measure the resistance of the plastic toward indentation. Both scales provide an empirical hardness value that doesn't correlate to other properties or fundamental characteristics. Rockwell hardness is generally chosen for 'harder' plastics such as nylon, polycarbonate, polystyrene, and acetal where the resiliency or creep of the polymer is less likely to affect the results.

The results obtained from this test are a useful measure of relative resistance to indentation of various grades of plastics. However, the Rockwell hardness test does not serve well as a predictor of other properties such as strength or resistance to scratches, abrasion, or wear, and should not be used alone for product design specifications.

The Rockwell hardness tester to measure the hardness of metal measures resistance to penetration like the Brinell test, but in the Rockwell case, the depth of the impression is measured rather than the diametric area. With the Rockwell tester, the hardness is indicated directly on the scale attached to the machine. This dial like scale is really a depth gauge, graduated in special units. The Rockwell hardness test is the most used and versatile of the hardness tests.

For soft materials such as copper alloys, soft steel, and aluminum alloys a $\frac{1}{16}$" diameter steel ball is used with a 100-kilogram load and the hardness is read on the "B" scale. In testing harder materials, hard cast iron and many steel alloys, a 120 degrees diamond cone is used with up to a 150 kilogram load and the hardness is read on the "C" scale. The Rockwell test uses two loads, one applied directly after the other. The first load, known as the "minor" load of 10 kilograms is applied to the specimen to help seat the indenter and remove the effects in the test of any surface irregularities. In essence, the minor load creates a uniformly shaped surface for the major load to be applied to. The difference in the depth of the indentation between the minor and major loads provides the Rockwell hardness number. There are several Rockwell scales other than the "B" & "C" scales, (which are called the common scales). The other scales also use a letter for the scale symbol prefix, and many use a different sized steel ball indenter. A properly used Rockwell designation will have the hardness number followed by "HR" (Hardness Rockwell), which will be followed by another letter which indicates the specific Rockwell scale. An example is 60 HRB, which indicates that the specimen has a hardness reading of 60 on the B scale. There is a second Rockwell tester referred to as the "Rockwell Superficial Hardness Tester". This machine works the same as the standard Rockwell tester, but is used to test thin strip, or lightly carburized surfaces, small parts or parts that might collapse under the conditions of the regular test. The Superficial tester uses a reduced minor load, just 3 kilograms, and has the major load reduced to either 15 or 45 kilograms depending on the indenter, which are the same ones used for the common scales. Using the $\frac{1}{16}$" diameter, steel ball indenter, a "T" is added (meaning thin sheet testing) to the superficial hardness designation. An example of a superficial Rockwell hardness is 15T-22, which indicates the superficial hardness as 22, with a load of 15 kilograms using the steel ball. The ASTM (American Society for Testing & Materials) has standardized a set of scales (ranges) for Rockwell hardness testing. Each scale is designated by a letter.

SCALE TYPICAL APPLICATIONS

A: Cemented carbides, thin steel and shallow case hardened steel
B: Copper alloys, soft steels, aluminum alloys, malleable iron.
C: Steel, hard cast irons, pearlitic malleable iron, titanium, deep case hardened steel and other materials harder than B 100
D: Thin steel and medium case hardened steel and pearlitic malleable iron
E: Cast iron, aluminum and magnesium alloys, bearing metals
F: Annealed copper alloys, thin soft sheet metals
G: Phosphor bronze, beryllium copper, malleable irons
H: Aluminum, zinc, lead
K, L, M, P, R, S, V: Bearing metals and other very soft or thin materials, including plastics.

In another embodiment of this invention, the closed cell foam core support has at least one flange layer of polyolefin and in particular polyethylene. Polyethylene is desirable in some imaging elements because of it improved adhesion to gelatin-based light sensitive silver halide emulsion. When added resistance to indicia transfer is desirable, polypropylene may be used because it provides a slightly harder surface. If polypropylene is used for the upper surface, it may be desirable to have an additional primer layer or surface treatment to improve adhesion to gelatin based silver halide imaging layers.

In another embodiment of this invention, the closed cell foam core containing support may comprise at least one flange layer comprising a voided biaxially oriented polypropylene sheet. Biaxially oriented sheets and biaxially oriented voided sheets are also desirable. The biaxially orientation process provides a polymer whose surface is typically more crystalline than melt extruded (non-oriented) polymers, thus offering improved resistance to indicia transfer. In the case of voided biaxially oriented sheets the added voided layer provides addition compressive properties to resist indicia transfer. In these embodiment the biaxially oriented sheet are adhered to a closed cell foam core containing support.

In those cases where additional hardness is desirable the support may contain at least one flange layer that comprises polyester. When polyester is the uppermost layer it will have good resistance to indicia transfer from the backside embossed indicia. When using polyester, a primer or gel sub layer may be required for improved adhesion of the imaging layers.

In those case where additional hardness is desirable, the support may contain at least one flange layer that comprises polycarbonate. When polycarbonate is the uppermost layer, it will have good resistance to indicia transfer from the backside embossed indicia. When using polycarbonate, a primer or gel sub layer may be required for improved adhesion of the imaging layers.

In all the above embodiments the flange layer may also contain at least one outer layer of polyethylene. Polyethylene is desirable for ease of processing and good adhesion to imaging layers.

Another means to reduce the transfer of indicia to from a backside embossed logo indicia to the face side is to have at least one flange layer surface that is adjacent to an imaging layer, and this surface has a surface roughness of from 15 to 150 micrometers. A surface roughness below 15 tends to be relatively glossy and more prone to indicia transfer while surfaces above 150 micrometers have limited improvement in their ability to resist indicia transfer.

In another embodiment of this invention it may be useful to have an upper surface of a support having an average roughness of from 0.1 µm to 1.1 µm. In this case, the surface is glossy and may be used for consumer applications where a glossy surface is preferred. Typically, surfaces having a roughness below 0.1 micrometer are difficult to manufacture while surfaces having a roughness above 1.1 micrometer tend to be less glossy. With a very smooth glossy surface, it is desirable to provide an upper surface that is adjacent to the imaging layer that is very hard. Such a surface may be a crosslinked polymer such as polyurethane or epoxy. Addenda materials may be added, such as beads or particles, that provide some standoff between layers when wound in roll form but this typically will increase the surface roughness.

Imaging elements are constrained to a range in stiffness and caliper. At stiffnesses below a certain minimum stiffness, there is a problem with the element in print stackability and print conveyance during transport through photofinishing equipment, particularly high speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important that the caliper of the imaging element be constrained from 75 µm to 350 µm for transport through photofinishing equipment.

Imaging elements are also typically constrained by consumer performance and present processing machine restrictions to a stiffness range of from approximately 50 mN to 250 mN and a caliper range of from approximately 100 µm to 400 µm. In the design of the element used with the invention, there exists a relationship between stiffness of the imaging element and the caliper and modulus of the closed cell foam core and modulus of the flange layers, that is, for a given core thickness, the stiffness of the element may be altered by changing the caliper of the flange layer and/or changing the modulus of the flange layer and/or changing the modulus of the closed cell foam core.

If the target overall stiffness and caliper of the imaging element are specified then for a given core thickness and core material, the target caliper and modulus of the flange layers are implicitly constrained. Conversely, given a target stiffness and caliper of the imaging element for a given caliper and modulus of the flange layers, the core thickness and core modulus are implicitly constrained.

Preferred ranges of closed cell foam core caliper and modulus and flange layer caliper and modulus follow: the preferred caliper of the closed cell foam core used in the invention ranges from 200 µm to 350 µm, the caliper of the flange layers used in the invention ranges from 10 µm to 175 µm, the modulus of the closed cell foam core used in the invention ranges from 30 MPa to 1000 MPa, and the modulus of the flange layers used in the invention ranges from 700 MPa to 10500 MPa. In each case, the above range is preferred because of (a) consumer preference, (b) manufacturability, and (c) materials selection. It is noted that the final choice of flange layer and core materials, modulus, and caliper will be a subject of the target overall element stiffness and caliper.

The suitable range in caliper of the closed cell foam core is from 25 µm to 350 µm. The preferred caliper range is from 50 µm to 200 µm because of the preferred overall caliper range of the element that lies from 100 µm to 400 µm.

The selection of core material, the extent of density reduction (foaming), and the use of any additives/treatments for, for example, cross-linking the foam, determine the closed cell foam core modulus. The selection of flange layer materials and treatments (for example, the addition of strength agents for paper support or the use of filler materials for polymeric flange layer materials) determines the flange layer modulus.

For example, at the low end of target stiffness (50 mN) and caliper (100 µm), given a typical polyolefin foam of caliper 50 µm and modulus 137.9 MPa, the flange layer caliper is then constrained to 25 µm on each side of the core, and the flange layer modulus required is 10343 MPa, properties that may be met using a high modulus paper base. Also, for example, at the high end of target stiffness (250 mN) and caliper (400 µm), given a typical polyolefin foam of caliper 300 µm and modulus 137.9 MPa, the flange layer caliper is constrained to 50 µm on each side and the flange layer modulus required is 1034 MPa, properties that may be met using a polyolefin flange layer.

In a preferred lamination embodiment of this invention, the flange layers used comprise high modulus polymers such as high density polyethylene, polypropylene, or polyester; their blends or their copolymers; that have been stretched and oriented. They may be filled with suitable filler materials as to increase the modulus of the polymer and enhance other properties such as opacity and smoothness. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, and polyester fibers. The preferred fillers are talc, mica, and calcium carbonate because they provide excellent modulus enhancing properties.

In another preferred embodiment of this invention the upper and lower flange layers are preformed sheets of oriented polymer that are adhesively adhered to the closed cell foam core. In this embodiment, the lower flange layer may be pre-embossed with indicia prior to being attached to the closed cell foam core. This means of embossing is preferred because it may be carried out separately from the closed cell foam core to minimize any potential collapse of the core.

The elements used with the invention may be made using several different manufacturing methods. The coextrusion, quenching, orienting, and heat setting of the element may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the closed cell foam core component of the element and the polymeric integral flange layer components are quenched below their glass solidification temperature. The flange layer components may be extruded through a multiple stream die with the outer flange layer forming polymer streams not containing foaming agent, alternatively, the surface of the foaming agent containing polymer may be cooled to prevent surface foaming and form a flange layer. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining, to some degree, the sheet against retraction in both directions of stretching.

The imaging member support, while described as having a closed cell foam core and at least one flange layer, preferably at least three layers of a closed cell foam core and a flange layer on each side, may also be provided with additional layers that may serve to change the properties of the element. Imaging member could be formed with multiple surface layers that would provide an improved adhesion or look.

The imaging member support may also be made through the extrusion laminating process. Extrusion laminating is carried out by bringing together the polymeric flange layers used with the invention and the closed cell foam core with application of an adhesive between them, followed by their being pressed in a nip such as between two rollers. The adhesive may be applied to either the flange layers or the closed cell foam core prior to their being brought into the nip. In a preferred form where the adhesive is a melt extrudable polymer, the adhesive is applied into the nip essentially simultaneously with the flange layers and the closed cell foam core. In the case of a liquid coated adhesive, it is preferable to apply the adhesive to either the closed cell foam core or to the flange layer prior to bring the two webs together. The adhesive may be any suitable material that does not have a harmful effect upon the element. A preferred melt extrudable material is polyethylene that is melted at the time it is placed into the nip between the closed cell foam core and the flange layer. Addenda may also be added to the adhesive layer. Any known material used in the art to improve the optical performance of the system may be used. The use of titanium dioxide and or talc is preferred. During the lamination process, it is also desirable to maintain control of the tension of the flange layers in order to minimize curl in the resulting laminated receiver support.

In the embodiments in which the flange layers are extruded onto the closed cell foam core, it may be useful to provide an upper surface polymer that has a high hardness level that will resist the transfer of the logo indicia to the upper flange layer. Useful polymers for this invention may include polypropylene, polyesters, low, medium and high density polyethylene. In another embodiment, the lower or backside flange layer may be a relatively smooth surface in order to spread the compressive load force over a larger footprint and thereby reduce the unit pressure loading.

The range in density reduction of the closed cell foam core is from 20% to 95%. The preferred range in density reduction is from 40% to 70%. This is because it is difficult to manufacture a uniform product with very high density reduction (over 70%). Density reduction is the percent difference between solid polymer and a particular foam sample. It is also not economical to manufacture a product with density reduction less than 40%.

In addition to the stiffness and caliper, an imaging element needs to meet constraints in surface smoothness and optical properties such as opacity and colorimetry. Surface smoothness characteristics may be met during flange layer sheet manufacturing operations such as foam core manufacturing or during the manufacture of oriented polymers like oriented polystyrene, polyolefins and oriented polyesters. Alternatively, surface roughness characteristics may be met by extrusion coating additional layer(s) of polymers such as polyethylene onto the flange layers in contact with a textured chill-roller or similar technique known by those skilled in the art.

Optical properties such as opacity and colorimetry may be met by the appropriate use of filler materials such as titanium dioxide and calcium carbonate and colorants, dyes and/or optical brighteners or other additives known to those skilled in the art. The fillers may be in the flange layer or an overcoat layer, such as polyethylene. Generally, support materials for color print imaging materials are white, possibly with a blue tint as a slight blue is preferred to form a preferred white look to whites in an image. Any suitable white pigment may be incorporated in the polyolefin layer such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the flange layer or resin coat layers. The preferred pigment is titanium dioxide. In addition, suitable optical brightener may be employed in the polyolefin layer including those described in *Research Disclosure*, Vol. No. 308, December 1989, Publication 308119, Paragraph V, page 998.

In addition, it may be necessary to use various additives such as antioxidants, slip agents, or lubricants, and light stabilizers in the plastic elements, as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl)imino]}(Chimassorb 944 LD/FL).

In the method for placing indicia on a support for an imaging element useful in this invention, the means of placing the indicia on the backside of the support may be done with an embossed roller, preferably chilled, that is temperature controlled. Temperature control is an important processing controlled to quench the melt extrudable polymer inline during the manufacturing process. The indicia may be engraved on the roller by several means such as laser or mechanical engraving, or chemical etching processes. The indicia may form a character, or a logo with at least one character. In other useful embodiments, the indicia, such as characters, may comprises at least one member selected from the group consisting of letters, pictures, numbers, symbols, and words. An additional useful embodiment of this invention would be to apply ink or colored material to the embossed logo indicia area or to the background area and not the logo indicia, in order to provide indicia that are easier to view and is less angular dependant when viewing. Such ink or colored solution may be aqueous or solvent-based.

Ink formulas used in the printing industry need to provide a variety of functions. In an effort to print on a particular substrate, the inks needs to provide good adhesion, wear resistances and also have chemical compatibility. Printing inks also need to be formulated and optimize to the printing method in which it is to be applied. For instances, in a gravure printing method the ink formula needs to have its viscosity adjusted for good release from the roller cells. Additionally the ink formula needs to be able to wet the substrate. This may be accomplished by the addition of solvents, lowering the solids of the formulations or adding addenda such as surfactants. The web substrate may also be pretreated such as a corona discharge treatment, flame treatment or perhaps priming the web surface to be printed. The inks also have to be pleasing to the viewer in-order to convey a sense of quality. Often the print helps to sell the product it is associated with.

When applying ink to a polymer based non-porous substrate, such as polypropylene or a pigment-filled polypropylene, the binder selection is facilitates good adhesion. When the substrate to be printed is to be used for imaging, such as in a photographic imaging substrate, the demands on the ink formula become even greater. If the print indicia is placed on the outer polymer layer, it is exposed to chemical processing conditions such as high and low pH conditions that may cause the ink binder to swell as well as physical abrasion in high speed processing equipment. Often the web is accelerated and decelerated at high rates, web conveyance often steers the web across rollers and other parts of a processor. In general the ink formula needs to survive some very unique conditions.

Another material in the ink formula is the pigment. This is the part of the formula that provides the color to the printed indicia. This needs to provide good color matching and also needs to provide some level of light (UV and visible) stability to the indicia. Pigments are dispersed in the vehicle, which is the liquid portion of the formula, such as water and solvent, that carries them. Generally, ink pigments may be classified as azo, polycyclic, acid dye based basic dye salts and inorganics. Azo materials may include monoazo, disazo, triazo and polyazo. Additional details may be obtained from *The Printing Ink Manual* 3$^{rd}$ edition ISBN 7198 2528 8.

Pigments are colorants which are considered to be effectively insoluble in the application medium, and many such compounds are well known and in wide commercial use. Various classes of pigments are classified in the Pigments and Solvent Dyes section of the Color Index International, published by the Society of Dyers and Colorists in 1997, and there are of course many insoluble colorants which are not in this list. It is common practice to provide pigment compositions in the form of finely divided dispersions, which may be produced by well known methods such as ball milling, media milling or by the methods disclosed in U.S. Pat. Nos. 5,026,427 and 5,310,778.

Other pigments useful with this invention may include titanium dioxide, zinc based pigments, lead based pigments, antimony oxide, CaCO3, silicas, silicates such as aluminum silicate, natural calcium silicates, sodium aluminosilicates, magnesium silicate, micas, nepheline, magnesium aluminum silicate, and sulfate based pigments, such as BaSO4. Other useful materials may include oxides such as red, yellow, brown, zinc and magnesium ferrite, hydrated chromium oxide and chromic oxide. While these may be used for many imaging application, some care and added evaluation is needed when these and other materials are in photographic application. Some materials may cause photo reactivity with the light sensitive emulsion. Also, pigments may include chromates, such as chrome green, molybdate orange, lead chrome pigments, and cadmium based pigments. Again, some caution is need to assess photo reactivity issues as well as environmental problems. Additional pigments may include ferriferrocyanides, ultramarine pigments, nickel antimony titanate yellow, chrome antimony titanate, cobalt aluminate, manganese violet, manganese antimony, bismuth vanadate, molybdate yellow, nitroso pigments, monoazo based colors, disazo-based colors, disazo condensation pigments, basic-dye based pigments including alkali, quinacridone pigments, carbazole dioxazine, alizarine lake, vat pigments, phthalocanines, isoindoline-based pigments, tetrachloroisoindolinone-based pigments, pyrazoloquinazolone, black pigments such as carbon black, graphite, iron oxide, copper and chrome black, metallic pigments including aluminum flake, gold bronze flake, stainless steel flake, luminescent organic pigments, fluorescent and phosphorescent inorganic pigments. Additional details and information on other useful pigments for this invention may be obtained from the *Pigment Handbook* by Peter Lewis ISBN 0-8155-0811-5. Other useful material may include butanamide, pigment yellow 14, pigment yellow 74, the azo metal complex pigments, hydrocarbyl polypropyleneamine, tetrapropylenepentamine, tallowalkyl tripropylenetetramine, tallowalkyl dipropylenetriamine, cocoalkyl tetrapropylenepentamine, cocoalkyl tripropylenetetramine, cocoalkyl dipropylenetriamine, stearyl tetrapropylenepentamine, stearyl tripropylenetetramine, stearyl dipropylenetriamine, oleyl tetrapropylenepentamine, oleyl tripropylenetetramine, oleyl dipropylenetriamine, lauryl tetrapropylenepentamine, lauryl tripropylenetetramine, lauryl dipropylenetriamine, decyl tetrapropylenepentamine, decyl tripropylenetetramine, decyl dipropylenetriamine, myristyl tetrapropylenepentamine, myristyl tripropylenetetramine, myristyl dipropylenetriamine, palmyl tetrapropylenepentamine, palmyl tripropylenetetramine, palmyl dipropylenetriamine, isodecyl tetrapropylenepentamine, isodecyl tripropylenetetramine, and isodecyl dipropylenetriamine. Suitable organic pigments are, for example, those of the beta-naphthol, Naphthol AS, benzimidazolone, isoindolinone and isoindoline series, also polycyclic pigments for example from the phthalocyanine, quinacridone, perylene, perinone, thioindigo, anthraquinone, dioxazine, quinophthalone and diketopyrrolopyrrole series. Suitable pigments also include solid solutions of the pigments mentioned, mixtures of organic and/or inorganic pigments with organic and/or inorganic pigments such as, for example, carbon black, coated metal, mica or talc pigments, for example, mica CVD-coated with iron oxide, and also mixtures between the pigments mentioned. Other suitable pigments include flaked dyes such as Ca, Mg and Al lakes of sulpho- and/or carboxyl-containing dyes. Pigmented ink may also be purchased from supplier such as Kroma Corporation, Flint Ink, Sun Chemical and others. Whatever pigment is selected needs to be evaluated for overall performance within the photographic system, to assure that it does not leech into processing chemistry, change color, or interact with the photographic or other.

For purposes of the present invention, the term solvent refers to a wide variety of solid, liquid and gaseous substances but for the purpose of this invention, the disclosure will be based mostly on liquid base substances. Ink manufacturers make solutions and dispersions by mixing substances that may not spontaneously intermix on a molecular scale but remain in solution or suspension. For the purpose of a process survivable ink, it is desirable to have an ink that has high film forming properties at a relatively low viscosity, while the solvent must separate from the film and evaporate during drying. Solvents are used to dissolve or disperse solid phase materials in solution so they may be more easily printed and dried.

Ink solvents for printing may be selected from a number of solvents. It should be noted that make-ink formulas are a mixture of solvents and water. In general, if there is more than 50% water in the formula, it is termed water-based or aqueous. Some people also refer to water as a solvent. In the true chemical definition, water is a solvent. In general, solvents with a high hydroxyl content are strongly polar and high dielectric constant, while hydrocarbons and other solvents are non-polar and have a low dielectric constant. Solvents may be use as individually substances or they may be mixed to form co-solvents. Useful solvents must have a good solubility parameter and also an appropriate evaporation rate for the process in which they are used. Slow solvents with low volatility are necessary for printing press stability. The ability to control the rate of evaporation is important. The evaporation rate of a blend varies, based on the components, the concentration and the temperature. Volatility at a given temperature is largely determined by the vapor pressure and the heat of evaporation. It may also be necessary to provide a balance to an ink formula with solvents. In some cases, having an ink formula with a constant boiling temperature (azeotrope) may be desirable. Useful solvents may include, but are not limited to, aliphatic hydrocarbons, aromatic hydrocarbons such as benzene, toluene, xylene, naphthenic, monohydric alcohol, alipatic and alicyclic, glycol, glycol ether, ketone and esters. Typical alcohols include methyl, ethyl, propyl,butanols and their blends and mixtures thereof. Useful glycols include ethylene, propylene, hexlene, diethylene, dipropylene, triethylene and glycerine. Glycol ethers includes methylene glycol, methyl cellosolve, ethylene glycol, cellosolve, butyl glycol, butyl cellosolve, butyl digol and butyl carbitol and their derivatives. Ketones based materials include acetone, dimethyl ketone, methyl ethyl ketone, methyl iso-butyl ketone, cyclohexanone, isophorone, diacetone alcohol and mixtures thereof. Esters may include ethyl acetate, isopropyl acetate, n-butyl acetate.

Additionally, it may be necessary to add plasticizers to provide dried ink flexibility. These materials may also minimize the binder polymer from forming a surface skin during drying and trapping solvent in the print area. Useful plasticizers may include dibutyl phthalate, triethyl citrate or cyclohexanol phthalate. Additional materials may be found Raw Materials Data Handbook Volume 2 from the National Printing Ink research Institute. To improve wear resistance, improve slip and provide water repellency in the print area, it may be desirable to add waxes to the formulation. Useful waxes may include polyethylene waxes, polytetrafluoroethylene, fatty amides, halogenated hydrocarbon waxes, natural waxes, petroleum waxes.

Another useful means of providing embossed indicia provides a method for placing indicia on a support for an imaging element comprising providing a support with a closed cell foam core wherein the closed cell foam core comprises a polymer that has been expanded through the use of a blowing agent, and pressing the support against an embossed roller. In this manner the embossed indicia is pressed into the closed cell foam core. This may be done in-line, during the making of the support, after foaming, or by pre-embossing a polymer sheet and then adhering the embossed polymer sheet to the closed cell foam core.

Used herein, the phrase 'imaging element' comprises an imaging support as described above along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images. An embodiment of this invention for the method placing indicia on a support that is used as an imaging element may contain silver halide, an ink jet receiving layers, thermal dye receiving layers or electrophotographic layers.

The thermal dye image-receiving layer of the receiving elements used with the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from 1 to 10 g/m$^2$. An overcoat layer may be further coated over the dye-receiving layer, such as described in U.S. Pat. No. 4,775,657 of Harrison et al.

Dye-donor elements that are used with the dye-receiving element used with the invention conventionally comprise a support having thereon a dye containing layer. Any dye may be used in the dye-donor employed in the invention, provided it is transferable to the dye-receiving layer by the action of heat. Especially good results have been obtained with sublimable dyes. Dye donors applicable for use in the present invention are described, for example, in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly (ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads that may be used to transfer dye from dye-donor elements to receiving elements used with the invention are available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage useful with the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, may be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as ink jet image media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, may be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer may be used in combination with the external polyester-based barrier layer used with the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer may be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer may also protect the ink receiving layer from abrasion, smudging, and water damage. In general, this overcoat layer may be present at a dry thickness of 0.1 to 5 μm, preferably 0.25 to 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, and light stabilizers. In addition, a mordant may be added in small quantities (2%-10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating. Some of these methods allow for simultaneous coatings of both layers, which is preferred from a manufacturing economic perspective.

The DRL (dye receiving layer) is coated over the tie layer or TL at a thickness ranging from 0.1-10 μm, preferably 0.5-5 μm. There are many known formulations that may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based DRL formulations comprising vinyl copolymers that are subsequently cross-linked. In addition to these examples, there may be other known or contemplated DRL formulations, which are consistent with the aforementioned primary and secondary requirements of the DRL, all of which fall under the spirit and scope of the current invention.

The preferred DRL is 0.1-10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers.

Although the ink-receiving elements as described above may be successfully used to achieve the objectives of the present invention, it may be desirable to overcoat the DRL for the purpose of enhancing the durability of the imaged element. Such overcoats may be applied to the DRL either before or after the element is imaged. For example, the DRL may be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, humectants. Inks preferred for use in combination with the image recording elements used with the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper supports are useful in combination with silver halide images because the contrast range of the silver halide image is improved, and show through of ambient light during image viewing is reduced. The preferred photographic element used with this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 µ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. The present invention may utilize a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula: (I)

[ML$_6$]$^n$ wherein n is zero, −1, −2, −3, or −4; M is a filled frontier orbital polyvalent metal ion, other than iridium; and L$_6$ represents bridging ligands which may be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977. The photosensitive imaging layers described therein provide particularly desirable images on the support used with this invention.

In one embodiment, this invention is directed towards a photographic recording element comprising a support and at least one light sensitive silver halide emulsion layer comprising silver halide grains as described above.

The following examples illustrate the practice of this invention. They are not intended to be exhaustive of all possible variations of the invention. Parts and percentages are by weight unless otherwise indicated.

EXAMPLES

The chill roller used for embossing the example below was engraved with indicia in the form of a logo in which there were raised indicia, such as letter characters, from the background of the chill roller. The height difference was 20 microns and the roughness of the raised letter was 150 Ra and the background was 2Ra.

Example 1 (Control)

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% titanium dioxide on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc. This paper base was then resin coated with 27 g/m$^2$ of low density polyethylene (0.917 g/cc from Eastman Chemical) containing rutile titanium dioxide (DuPont R104) on the top side and 27 g/m² of clear polyethylene (0.0924 g/cc) on the backside.

Example 2

Polypropylene foam of caliper 6.0 mil and density 0.53 g/cm³ was obtained from Berwick Industries, Berwick, Pa. This was then extrusion resin coated on both sides using a flat sheet die. The upper flange layer or the face side of the foam was coextrusion coated. The layer closer to the foam was coated at 7.5 lbs/ksf coverage, at a melt temperature of 274° C., and comprised approximately 10% anatase titanium dioxide, 20% Mistron CB Talc (from Luzenac America), 20% PA609 (amorphous organic polymer from Exxon Mobil) and 50% PF611 (polypropylene homopolymer—extrusion coating grade from Basell). The skin layer was coated at 107 g/m² coverage, at a melt temperature of 300C, and comprised approximately 18% titanium dioxide, 4.5% ZnO, and 78.5% D4002 P (low density polyethylene from Eastman Chemical Company). The lower flange layer or the wire side of the foam was monoextrusion coated at 300 C melt temperature. The lower flange layer coating was at 485 g/m² coverage and comprised approximately 10% anatase titanium dioxide, 20% Mistron CB Talc, 20% PA609 and 50% PF611. The melt extruder polypropylene was extruded from a coathanger flat sheet die. The polymer was extruded into a nip formed by a chill roller and a pressure roller with the polypropylene foam core sheet being the primary web substrate that was against the pressure roller and the molten polypropylene flange layer against the chill roller surface. The surface of the chill roller had been previously engraved with a reverse image of the desired information to be embossed. The embossed indicia, in the form of patterns, basically comprised raised or recessed areas of one roughness and a background area of a different height with a different roughness. When the molten polymer enters the nip formed the pressure roller and the polypropylene foam core and the chill roller, the pressure in the nip forces the fluid polymer to conform to the surface. As the polymer cools and solidifies, it replicates the surface with the different height and roughness profiles.

Example 3

This sample was prepared as example 2, except that the upper flange layer was a sheet of voided biaxially oriented polypropylene that was adhered to the closed cell foam core with an adhesive layer of a melt extrudable metallocene plastomer that was coated at coverage of 84 g/m². The polymer was melted at 315 C and extrusion coated between the biaxially oriented sheet and the polyester sheet into a pressure nip. The top sheet used in this example was coextruded and biaxially oriented. The orientation was approximately eight times the cross direction and five times in the machine direction. The top sheet was melt extrusion laminated to the closed cell foam core using a metallocene catalyzed ethylene plastomer (SLP 9088) manufactured by Exxon Chemical Corp. The metallocene catalyzed ethylene plastomer had a density of 0.900 g/cc and a melt index of 14.0. The voided biaxially oriented sheet was 1.5 mils thick. Top Sheet (Imaging Side)

A composite sheet consisting of 5 layers identified as L1, L2, L3, L4, and L5 was coated on the top or image side of the closed cell foam core. L1 is the thin colored layer on the outside of the package to which the photosensitive silver halide layer was attached. L2 is the layer to which optical brightener and titanium dioxide was added. The optical brightener used was Hostalux KS® manufactured by Ciba-Geigy. A coated extrusion grade anatase titanium dioxide was added to both L2 and L4. Table 3 below lists the characteristics of the layers of the top biaxially oriented sheet used in this example.

TABLE 3

| Layer | Material | Thickness, μm |
|---|---|---|
| L1 | Polyethylene + color concentrate | 0.75 |
| L2 | Polypropylene + 24% TiO$_2$ + OB | 6.65 |
| L3 | Voided Polypropylene | 21 |
| L4 | Polypropylene + 18% TiO$_2$ | 6.85 |
| L5 | Polypropylene | 0.76 |

OB = optical brightener

On the backside, a lower flange layer of high density (0.930 g/cc) polyethylene was melt extruded at 315C. The melt polymer was brought together into the nip in which the chill roller had engraved logo indicia.

Example 4

This sample was prepared the same as example 2, except the upper and lower flange layers used a low density polyethylene instead of polypropylene.

Example 5

This sample was prepared the same as example 2, except the upper and lower flange layers used a high density polyethylene instead of polypropylene.

Example 6

This sample was prepared the same as example 3, except the upper flange layers used a sheet voided biaxially oriented polyester in which there was a voided portion of the sheet and a solid polyester skin on the upper surface.

The multi-layer sheet of voided biaxially oriented polyester was prepared by cast extruding as an integral sheet on a chill roll, drafted in the machine direction and then in the transverse direction, approximately 3.times.3. A microvoided polyester layer comprised polyethylene terephthalate and microbeads with a layer thickness of 25 μm and a percent voiding of 50%.

The voiding agent was a cross-linked microbead of polystyrene with divinylbenzene in the amount of 50% by weight of the layer. The mean particle size of the microbead was between 1 to 2 μm and the microbeads were coated with a slip agent of colloidal alumina. The preparation steps for the cross-linked microbeads used to void the middle layer of the coextruded support were as follows:

(1) The microbeads were prepared by conventional aqueous suspension polymerization to give nearly mono-disperse bead diameters from 2 to 20 μm and at levels of cross-linking from 5 mol % to 30 mol %.

(2) After separation and drying, the microbeads were compounded on conventional twin-screw extrusion equipment into the polyester at level of 25% by weight and pelletized to form a concentrate, suitable for let-down to lower loadings.

(3) The microbead concentrate pellets were mixed with virgin pellets and dried using standard conditions for polyethylene terephthalate, 170-180 degrees C convection with desiccated air for between 4-6 hours.

The layers were coextruded through a standard three-slot coat hanger die at 265 degrees C. onto a chill roll controlled at a temperature between 50-60 degrees C. The layered film was stretched biaxially using a standard laboratory film-stretching unit at a temperature of 105 degrees C. The upper and lower surfaces were solid layers of polyester with a density of approximately 1.3 g/cc.

The bottom layer of the coextruded support was a solid layer of polyester with an intrinsic viscosity of at about 0.68 cps. The polyester layer had a thickness of 8.0 μm. The polyester layer contained 0.12% by weight of optical brightener, 24% by weight of titanium dioxide. The optical brightener used was Hostalux KS manufactured by Ciba-Geigy. The rutile titanium dioxide used was DuPont R104 (a 0.22 micrometer particle size titanium dioxide). The sheet was then laminated to the paper base with a melt extruded blend of polyethylene and anhydride-modified ethylene acrylate at 365 degrees C. The polyester sheet, melt polymer and paper were simultaneously brought together into the chilled pressure nip. The L8 layer is a commercially available biaxially oriented sheet of polypropylene and was attached to the paper base with a melt polymer being extruded into a pressure nip. The writable/conductive layer is applied by a roller coating method on the cornea treated surface of the terpolymer surface.

The imaging support structure for Sample 6 is listed below
L1: Gel subbed polyester with 24% anatase titanium dioxide and optical brightener at 8 μm
L2: Voided polyester 25 μm thick with a density of 0.89 g/cc
L3: Polyester with 24% anatase titanium dioxide at 8 μm thick
L4: Bonding layer consisting a 20%/80% blend of DuPont Bynel and an extrusion grade low density polyethylene melt extruded at 12 g/m²
L5: Imaging grade cellulose base paper
L6: Bonding layer consisting a 20%/80% blend of DuPont Bynel and an extrusion grade low density polyethylene melt extruded at 12 g/m²
L7: Polyproplene with a skin of a copolymer of polyethylene and a terpolymer of ethylene propylene and butylene
L8: Styrene butadiene methacrylate coating Example 7

This sample was prepared the same as example 2 except the upper and lower flange layers used a low density polyethylene instead of polypropylene. The upper flange layer had a matte surface with a surface roughness of approximately 35Ra .

Surface Hardness
   Low means relative soft (Rockwell hardness near R10)
   Medium means slight harder (Rockwell hardness near R95)
   High means harder surface (Rockwell hardness grater than 100)
Compression Modulus
   Low means easy to compress (Compression modulus near 9 Mpa)
   Medium means slightly less compressibility (Compression modulus near 30 Mpa)
   High means little compressibility (Compression modulus near 45Mpa)
Resistance to indicia/pattern transfer on upper surface
   Low means more undesirable indicia/pattern transfer
   Medium means slightly less undesirable transfer
   High means little or no transfer

TABLE 2

| (Chill Roll Surface Roughness) | | |
|---|---|---|
| Ability to View embossed areas | Smooth Area (Ra) | Rough Areas (Ra) |
| Good Resolution | 0-2 | 150 |
| Poor | 4-5 | 50 |

Table 2 provides a description of the chill roll that was embossed with indicia, here, a pattern. For the purpose of this patent the smooth areas was the background and the rough area was the print indicia. It should be noted that background may be rougher and the indicia area smoother. The relative difference between the background and the patterned indicia areas determine the relative spectral reflection and the ability to see the indicia area. The higher difference between the two areas helps to determine the overall viewability. When such a surface is wound in a roll form under tension and pressure against another surface, the relative amount of transfer is determined by the compressibility of the support member and the relative hardness of the surface on which it is directly wound.

The results, as shown in Table 1, indicate that when a relative smooth and soft upper surface is coated on top of a hard relative non-compressable paper base (sample 1-control) and an embossed indicia with a difference in roughness

TABLE 1

| Sample ID | Upper Surface | Ra (micro inches) | Core | Upper Surface Hardness | Compression Modulus | Resistances to indicia / pattern transfer |
|---|---|---|---|---|---|---|
| 1 (control) | LDPE | 7 | Paper | Low | High | Low |
| 2 | PP | 7 | Foam | Medium | Low | High |
| 3 | BOPP | 7 | Foam | High | Medium | High |
| 4 | LDPE | 7 | Foam | Low | Low | Medium |
| 5 | HDPE | 7 | Foam | Low/Medium | Medium | High |
| 6 | BoPET | 3 | Foam | High | Medium | High |
| 7 | LDPE | 35 | Foam | Low | Low | High |

LDPE—Low Density polyethylene
PP—Polypropylene
BOPP—Biaxially oriented polypropylene (8 × 5 stretch ratio)
BoPET—Biaxially oriented polyester (3 × 3 stretch ratio)

between the background and the indicia area is pressed against the smooth and soft surface that there is little resistant to transfer embossing onto the smooth and soft surface.

Sample 2 provides an upper surface of relative smooth surface material on a compressible core. As indicated by Table 1, the expected results indicate that there is improved resistance to indicia transfer. Sample 3 provides a hard surface material with some additional compressibility on the same foam core. As shown in Table 1 the resistance to indicia transfer is higher. Sample 4 provides a relatively smooth surface material at the same nominal roughness as the control and there is a slight improvement in the transfer. Sample 5 provides a slightly harder surface layer and is expected to provide an improvement in the amount of transfer. Sample 6 provides a harder surface layer and results in a high resistance to indicia/pattern transfer. Sample 7 provides a soft but rougher surface with relatively low compressibility and provides improved resistance to indicia transfer as compared to the control sample.

The invention has been described in detail with particular reference to certain preferred embodiments thereof, but it will be understood that variations and modifications can be effected within the spirit and scope of the invention.

What is claimed is:

1. A method for placing indicia on a support for an imaging element comprising embossing indicia on a roller; providing a support wherein said support comprises a closed cell foam core having at least one molten polymer flange layer adhered thereto, wherein said closed cell foam core comprises a polymer that has been expanded through the use of a blowing agent; and pressing said at least one molten polymer flange layer of said support against said roller.

2. The method of claim 1 wherein said support has a compression modulus of greater than 8 Mpa.

3. The method of claim 1 wherein said support has a compression modulus of from 8 to 100 Mpa.

4. The method of claim 1 wherein said at least one flange layer comprises a polymer with a surface hardness of greater than 9 Rockwell R hardness.

5. The method of claim 1 wherein said at least one flange layer comprises a polymer with a surface hardness of from 9 to 150 Rockwell R hardness.

6. The method of claim 1 wherein said at least one flange layer comprises polyolefin.

7. The method of claim 1 wherein said at least one flange layer comprises biaxially oriented polypropylene.

8. The method of claim wherein said at least one flange layer comprises a voided biaxially oriented polypropylene.

9. The method of claim 1 wherein said at least one flange layer comprises polyester.

10. The method of claim 1 wherein said at least one flange layer comprises polycarbonate.

11. The method of claim 1 wherein said at least one flange layer further comprises at least one outer layer of polyethylene.

12. The method of claim 1 wherein said at least one flange layer is adjacent to an imaging layer and said at least one flange has a surface roughness of from 0.1 to 1.1 micrometers.

13. The method of claim 1 wherein said roller is temperature controlled.

14. The method of claim 1 wherein said roller is a chill roller.

15. The method of claim 1 wherein said roller is engraved.

16. The method of claim 1 wherein said roller is laser engraved.

17. The method of claim 1 wherein said roller is mechanically engraved.

18. The method of claim 1 wherein said roller is chemically etched.

19. The method of claim 1 wherein said indicia comprises a logo or a character.

20. The method of claim 19 wherein said character comprises at least one member selected from the group consisting of letters, pictures, numbers, symbols, and words.

21. The method of claim 1 wherein said closed cell foam core comprises polyolefin polymer.

22. The method of claim 21 wherein said polyolefin polymer comprises polypropylene.

23. The method of claim 1 wherein said closed cell foam core has a thickness of from 25 to 350 µm.

24. The method of claim 1 wherein the modulus of said closed cell foam core comprises from 30 MPa to 1000 Mpa.

25. The method of claim 1 wherein the modulus of said flange layers comprises from 700 MPa to 10500 MPa.

26. The method of claim 1 wherein said flange layers are integral with said closed cell foam core.

27. The method of claim 1, wherein said at least one flange layer further comprises pigment.

28. The method of claim 1, wherein said at least one flange layer further comprises talc.

29. The method of claim 1, wherein said at least one flange layer further comprises titanium dioxide pigment.

30. The method of claim 1 wherein said flange layers comprise polymer layers.

31. The method of claim 1 wherein the upper surface of said support has an average roughness of from 0.1 µm to 1.1 µm.

32. The method of claim 1 wherein the upper surface of said support has an average roughness of from 15 mm to 150 µm.

33. The method of claim 1 wherein the upper surface is a crosslinked polymer.

34. The method of claim 1 wherein said imaging element comprises at least one layer comprising photosensitive silver halide.

35. The method of claim 1 wherein said imaging element comprises an ink jet receiving member.

36. The method of claim 1 wherein said imaging element comprises a thermal dye receiving member.

37. The method of claim 1 wherein said imaging element comprises an electrophotographic element.

38. The method of claim 1 further comprising the step of applying ink to said indicia.

39. The method of claim 1 wherein said at least one flange layer comprises at least an upper flange layer and a lower flange layer.

* * * * *